Patented Oct. 19, 1948

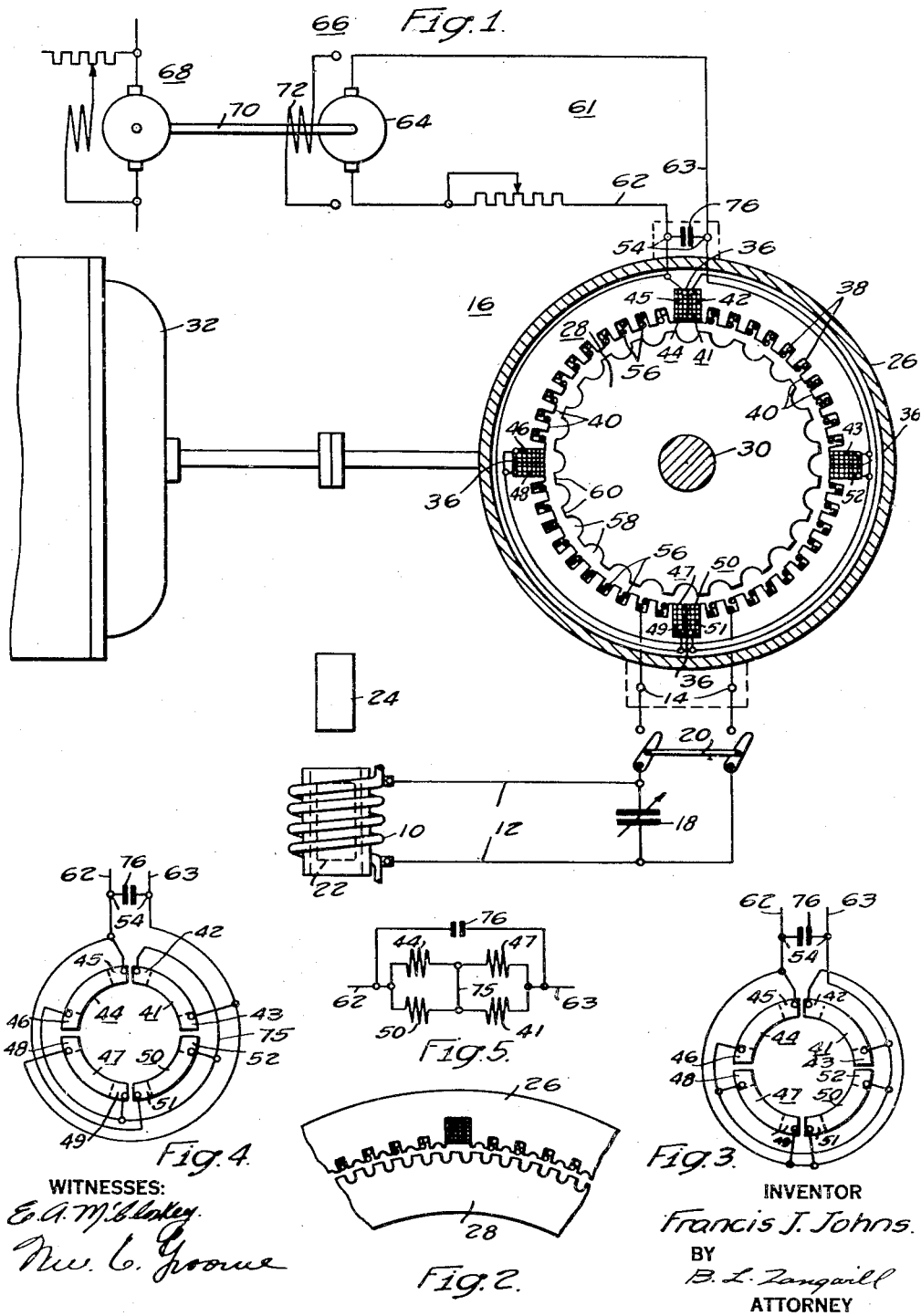

2,451,954

UNITED STATES PATENT OFFICE 2,451,954

INDUCTOR GENERATOR EQUIPMENT, ESPECIALLY FOR INDUCTION HEATING

Francis J. Johns, Pittsburgh, Pa., assignor to Westinghouse Electric Corporation, East Pittsburgh, Pa., a corporation of Pennsylvania Application April 3, 1945, Serial No. 586,306

20 Claims. (Cl. 171—252)

Broadly, my invention relates to inductor generator systems for induction heating or similar applications in which the alternating-current load currents, which the inductor generator must supply, vary considerably and repeatedly. Such variations may be caused, for example, by successively heating objects constituting the load, or by rapid changes in the characteristics of the load, or for any other reason.

Inductor generators, or alternating-current generators of the inductor type, conventionally have a plurality of unidirectional magnetic fields, each of which is of sufficient circumferential extent to embrace a plurality of distributed slots and teeth on a stator core. The slots may contain the active conductors of an alternating-current armature winding. By rotating a rotor member having peripheral teeth and slots, related in design and number to those of the stator member, the unidirectional magnetic flux interlinking the active conductors is caused to pulsate at relatively high frequency. The changing flux induces, in the armature winding, an alternating current which can be used to energize an induction heating coil means for heating metallic charges.

The unidirectional fields for the inductor generator are produced by a field winding which usually consists of a plurality of interconnected field coils that are magnetically interlinked or coupled with the armature winding. The field winding in series with a low voltage direct-current voltage source which is part of a direct-current excitation circuit. The direct-current voltage source usually is an exciter generator of a motor-generator set, the exciter generator commonly supplying about 50 volts, more or less. Consequently, the field coils of the inductor generator and the interconnected winding or windings of the direct-current exciter generator can be economically designed by using insulation that need not withstand much higher voltages, making allowances, of course, for an adequate factor of safety. However, the aforesaid pulsations in the undirectional magnetic field, produced by the rotating rotor member, also generate or induce a relatively high frequency alternating-current electromotive force in the field winding of the inductor generator. The magnitude of this induced electromotive force is comparatively high, and may rise to as much as 5,000 volts and more, under transient conditions, especially those involving heavy load currents. Consequently, voltages of high magnitudes are, at times, across the excitation circuit, and tend to establish an alternating-current current therein.

The ordinary direct-current excitation circuit has such high impedance to alternating current of the frequencies induced in the inductor generator, that only minute alternating-current current can flow through this excitation circuit. This means that substantially the total voltage of the induced electromotive force will appear across the direct-current terminals of the inductor generator; and insulation breakdowns have occurred, in practice, in the field coils of the inductor generator and in the source of direct-current voltage for exciting these field coils, such as, for example, the armature or shunt field winding of an exciter generator.

An object of my invention is to safeguard the direct-current circuit of a high frequency inductor generator of a type described.

Another object of my invention is to minimize the aforesaid breakdowns in the direct-current excitation circuit of an inductor generator and its exciter.

A further object of my invention is to provide a system, such as for induction heating including an inductor generator, in which the load current can be safely varied quickly and frequently.

A more particular object of my invention is to provide a system, such as for induction heating including an inductor generator, which can be used for successively heating objects for short intervals without danger of insulation breakdowns in the system.

Other objects, features, innovations and combinations of my invention will be discernible from the following description of embodiments thereof, which is to be taken in conjunction with the accompanying schematic drawing in which:

Figure 1 is a wiring diagram, partly schematic, of a system embodying my invention, with a particular inductor generator adapted to deliver alternating current at 3,000 cycles per second;

Fig. 2 is a partial view for showing a slot and tooth arrangement for a particular inductor generator adapted to deliver alternating current at 10,000 cycles per second;

Figs. 3 and 4 are connection diagrams showing two different ways in which the field coils may be connected, in accordance with my invention, Fig. 3, corresponding to the connections shown in Fig. 1; and Fig. 5 is a simplified wiring diagram of Fig. 4.

Referring to the drawing, an induction heating system is shown comprising a water-cooled induction heating coil means 10 which is connected by conductors 12 to the alternating-current output terminals 14 of an inductor generator 16 of any suitable type. A variable capacitor bank 18 is provided across the induction heating coil means 10 for maintaining a high power factor in the alternating-current power delivered by the inductor generator. Switching means 20 is provided for controlling the supply of load current to the induction heating coil means 10. The inductor generator 16 may be of any conventional type which is used to provide high powers at frequencies above that available from the common commercial 60-cycle power lines. Present designs of such inductor generators may supply relatively high frequencies up to 10,000–15,000 cycles per second for use in induction heating systems.

The induction heating coil means surrounds a charge-receiving space in which a charge 22 has been diagrammatically indicated. After the charge 22 is heated, it is removed and a second charge 24 immediately thereafter introduced into the induction heating coil means 10. The alternating-current circuit, comprising the conductors 12 and the coil means 10, may be interrupted, if desired, through operation of the switch means 20 while the charge is being changed.

The inductor generator 16 comprises a stator member 26 and a rotor member 28 which is fixed to a shaft 30. The rotor member is driven by a prime mover shown as an electric motor 32, the shaft of which is an extension of the shaft 30. The speed of the motor 32 can be controlled.

The stator member 26 and rotor member 28 are formed in any usual way with core punchings or laminations. In Fig. 1, the outline of such punchings is shown for a particular inductor generator adapted to deliver an alternating current to its output terminals 14, having a frequency of 3,000 cycles per second. The stator punchings comprise relatively large field slots 36 at the cardinal points and a plurality of smaller slots 38 along its inner periphery between each pair of slots 36, the slots 38 providing teeth 40.

Each field slot 36 receives an active side of each of two field coils of the direct-current field winding of the inductor generator, the other active sides of these field coils being received in the next slots 36. A field coil 41 has one active side 42 in the top field slot 36 and one active side 43 in the right-hand field slot 36; and a second field coil 44 has one active side 45 in the aforesaid top field slot 36 and another active side 46 in the left-hand field slot 36. Another field coil 47 also has an active side 48 in the aforesaid left-hand field slot, and has an active side 49 in the bottom field slot 36. A fourth field coil 50 has an active side 51 in the same bottom field slot, and has an active side 52 in the right-hand field slot in which the active side 43 of the field coil 41, is located. The field coils are wound and disposed in the relatively widely-spaced slots 36 so as to provide unidirectional magnetic fields, each covering about 90 spatial degrees, with north and south poles following each other around the inner periphery of the stator. This means that four field coils are required for the machine being described. The field coils are connected to comprise a field winding which receives its energy through direct-current input terminals 54 for the inductor generator.

The armature slots 38 receive armature conductors 56 which are connected in an armature winding terminating at the output terminals 14 for the inductor generator 16. In order to provide the desired high frequency alternating current at these output terminals, the rotor member 28 is provided with alternating slots 58 and teeth 60; there being half as many slots and teeth in the rotor member as there are armature slots and teeth in the stator member, for this particular machine. Such ratio is not universal, and Fig. 2 shows a different slot arrangement in the stator and rotor members, in a ratio of 2/3 to 1, for a particular inductor generator operable at 10,000 cycles per second.

The direct-current field winding of the inductor generator 16 is provided with direct current through an excitation circuit 61 including conductors 62 and 63 which are connected to the input terminals 54. The conductors 62 and 63 extend to an armature 64 of a direct-current exciter generator 66 driven by a motor 68 to which it is directly connected through a shaft 70. A shunt-type field 72 is provided for the exciter generator. This field may be connected in shunt across the armature 64 of the exciter generator or may be separately energized in any suitable manner.

The direct-current resistance of the field winding of an inductor generator is usually very low as compared to its alternating-current reactance at the frequency of its output currents. For example, the field winding may have a reactance of about 5,000 to 125,000 ohms and a resistance of 3 to 70 ohms. Similarly, the reactance of the armature 64 and field 72 of an exciter generator is considerably higher than its resistance.

During operation of a system of the type described for induction heating, rotation of the shaft 30 changes the magnetic relations between the teeth and slots of the rotor and stator members. Under steady state conditions, the armature current provided by the inductor generator is accompanied by a pulsating magnetic field which reacts on the direct-current flux provided by the field coils of the inductor generator, and induces an output-frequency alternating-current electromotive force, or voltage, in each field coil of the inductor generator because of the non-linear characteristics of the saturation curve of iron, armature reaction and for other reasons. The magnitude of this induced alternating-current electromotive force, or voltage, depends on the magnitude of the alternating-current load taken by the induction heating coil means 10, and on the power factor of the load current flowing in the conductors 12.

Under steady state conditions, this induced alternating-current electromotive force in each direct-current field coil has been known to rise, in some types of machines, to as much as 1,000 volts and more. Under transient conditions, the magnitude may be about 5 to 10 times as great, especially if the system includes a phase balancing capacitor means, or the equivalent, in the output or load circuit for the inductor generator.

In accordance with my invention, the field coils are connected so that an induced alternating-current voltage always appears across the external terminals of the direct-current circuit of the exciter generator, specifically. the output terminals 54; but this voltage is kept low by providing a path for the flow of alternating current through the field winding, the path having sufficiently low impedance to the flow of this alternating current so as to cause most of the generated or induced electromotive force to spend itself in the field coils, leaving the actual voltage across the terminals 54 much less in magnitude than that of the total theoretical induced electromotive force.

To this end, I connect the field coils in parallel as shown in Figure 1 and more clearly in Fig. 3, or, preferably, in a special series-parallel arrangement as shown in Fig. 4. On the whole, ignoring phase-differences, the arrangement is such that the induced alternating-current electromotive force in each field coil is directed, at any instant, toward the same one of the terminals 54.

In the embodiment shown in Fig. 3, in which all of the field coils are connected in parallel, the highest possible magnitude of voltage across the insulation of any field coil will be that across the input terminals 54.

In Fig. 4, a conductor 75 is provided, inside the inductor generator, to which an end of each field coil is connected, and which is at a potential intermediate those of the conductors 62 and 63. This conductor provides closed loop paths among the field coils; and together with the conductors 62 and 63 provides a series-parallel connection for the field coils in which the field coils which produce the unidirectional magnetic fields of the same polarity, are connected in parallel between the conductor 75 and a conductor 62 or a conductor 63. Thus, spatially-opposite field coils 41 and 47, which produce magnetic fields of the same polarity with respect to the rotor, are connected directly between conductors 63 and 75, and field coils 44 and 50 are connected directly between conductors 62 and 75. Half of the direct-current supply voltage across conductors 62 and 63 is consumed in each field coil. As to the induced high-frequency electromotive force in the field winding, the conductor 75 provides a shorting path for any internally circulating alternating-current current. A common voltage will be across each pair of field coils which are in parallel.

Accordingly, the arrangement and connections of the field coils in Figs. 3 and 4 cause the induced electromotive forces in the field coils to be toward the same connection point, at all instances, assuming that phase relations are proper; but the parallel connections reduce the total increments that make up the voltages appearing across the terminals 54 each of which constitutes a connection point. If there is no alternating current flow in the field winding, such voltage will have a magnitude which, in Fig. 3, is substantially equal to that of the induced electromotive force in a single field coil, and, in Fig. 4, is substantially equal to the summation of that in two field coils in series. The parallel connections result in a lowering of the highest voltage that can appear across the terminals 54, and is an improvement to that extent. However, if there is no alternating current flow in the field winding, this magnitude of voltage on the terminals 54 may still be so high as occasionally to cause insulation punctures or breakdowns in the electrical equipment.

In furtherance of my invention, however, I provide a circuit across the input terminals 54 of the inductor-generator, which circuit does not affect the direct current in the excitation circuit, but which considerably further reduces the magnitude of the alternating-current voltage which would otherwise be across the terminals 54. Specifically, in the embodiments shown, I connect a capacitor 76 across the terminals 54, of a size to provide a very low impedance to alternating current at the frequency at which it is induced in the field winding. A capacitor of from about ½ to 80 microfarads is ample for frequencies in the range discussed. Thus at 10,000 cycles, a one microfarad capacitor has only about 16 ohms' reactance, far less than that of the field winding or exciter. This means that an alternating current of several milliamperes flows through the field winding and capacitor, assuming a reactaance of 100,000 ohms in the field winding. The alternating-current voltage at the input terminals 54, and consequently across the conductors 62 and 63, and hence across the exciter generator 66, is practically nil, being limited to only several volts as compared to the value observed hereinbefore, which might be considerably above 5,000 volts. The alternating-current voltage stresses in the excitation circuit are considerably decreased and what remains is confined to the field winding in which they are limited by the arrangement and connections of the field coils.

In general, the field coil connections, parallel, or preferably, special series-parallel, purposely establish an alternating-current voltage of limited magnitude across the terminals 54 and hence across a field coil or between field coils; but the maximum voltage which can appear across the field coils, across the input terminals 54 of the inductor generator and hence also across the parts of the exciter circuit 61, is considerably lowered by the addition of the circuit-completing capacitor 76 of comparatively low impedance. The connecting of the capacitor across the terminals 54 permits a significant alternating-current flow through the field-winding, which substantially consumes the generated or induced electromotive force in the field coils, so that only a small remnant of its total magnitude appears as a voltage across each field coil and across the terminals 54. In a sense, the conductor 75 augments the protection provided by the capacitor 76.

It is obvious that I have described my invention in its most simple aspects, but it is evident that it has considerably wider application, and that the teachings of my invention may give rise to other embodiments and further modifications.

I claim as my invention:

1. A system of a type described comprising a reactive load, an inductor generator having output connections for alternating current, and having a plurality of field coils providing unidirectional magnetic fields therein, field coils producing magnetic fields of the same polarity being connected in parallel, means for connecting said reactive load to said output connections, a phase-balancing capacitor means connected across said output connections, circuit-interrupting means in said output connections, and a capacitor means connected across said field coils.

2. Apparatus of a type described comprising an inductor generator having a direct-current field winding circuit-portion, said field-winding comprising a plurality of field coils, an alternating-current armature circuit-portion, a magnetic core means for magnetically coupling said circuit-portions, means for varying the magnetic coupling of said circuit-portions so as to induce an alternating current in said armature circuit-portion and an alternating-current ripple in said field winding circuit-portion, and circuit means associated with said field winding circuit-portion, for completing a circuit for a current flow of said alternating-current ripple in said field coils for limiting the alternating-current voltage across each of said field coils.

3. A system of a type described for supplying alternating current to a fluctuating reactive load, said system comprising, an inductor generator having a direct-current field winding circuit-portion comprising a plurality of field coils connected in parallel in a manner such that any induced alternating current therein is generally toward a common connection point, an alternating-current armature circuit-portion, said circuit-portions being magnetically coupled, and means, comprising a magnetic core, for varying the magnetic coupling of said circuit-portions so as to induce an alternating current in said armature circuit-portion and an alternating-current ripple in said field winding circuit-portion, a circuit means comprising said armature circuit for energizing said load, a phase-balancing capacitor connected across said armature circuit, a circuit-interrupter for said circuit means, an exciter circuit for energizing said field winding circuit-portion with direct current, and capacitor means connected across said field winding circuit-portion, having considerably lower reactance than said field winding circuit-portion and said exciter circuit at the frequency of said ripple.

4. Apparatus of a type described comprising an inductor generator having a direct-current field winding circuit-portion having a plurality of field-coils connected in parallel, an alternating-current armature circuit-portion, a magnetic core means for magnetically coupling said circuit-portions, and means for varying the magnetic coupling of said circuit-portions so as to induce an alternating-current in said armature circuit-portion and an alternating-current ripple in said field winding circuit-portion, an exciter generator for energizing said field winding circuit-portion with direct current, and capacitor means connected across said field winding circuit-portion, having lower reactance than said field winding circuit-portion and said exciter generator at the frequency of said ripple, whereby to prevent excess alternating-current voltages across said field winding circuit-portion and said exciter.

5. Apparatus of a type described comprising an inductor generator having a direct-current field winding circuit-portion comprising a plurality of field coils, an alternating-current armature circuit-portion, a circular magnetic core means for magnetically coupling said circuit-portions, means for varying the magnetic coupling of said circuit-portions so as to induce an alternating-current in said armature circuit-portion, and means associated with said field winding circuit-portion, comprising an impedance having considerably lower reactance than said field winding circuit-portion at the frequency of said alternating-current, for providing a closed current-flow path for alternating current induced in said field winding circuit-portion.

6. Apparatus of a type described comprising an inductor generator comprising a direct-current field winding circuit-portion having a plurality of field-coils, an alternating-current armature circuit-portion, a magnetic core means comprising a rotor for magnetically coupling said circuit-portions so as to induce an alternating current in said armature circuit-portion, means for connecting alternately disposed field coils in parallel, and relatively low reactance means for completing a path for the flow of alternating current through said field coils.

7. Apparatus of a type described comprising an inductor generator having a direct-current field winding circuit-portion having a plurality of field-coils connected in parallel, an alternating-current armature circuit-portion, a magnetic core means for magnetically coupling said circuit-portions, means for varying the magnetic coupling of said circuit-portions so as to induce an alternating current in said armature circuit-portion, and capacitor means connected across said field winding circuit-portion, having considerably lower reactance than said field winding circuit-portion at the frequency of said alternating current, whereby to prevent excessive alternating-current voltages across said field winding circuit-portion.

8. The invention of claim 6 but characterized further by a set of field-coils which are connected in parallel being connected in series with another set of field coils which are connected in parallel.

9. The invention of claim 7 but characterized further by the field-coils which are connected in parallel being alternately disposed field coils producing magnetic fields of the same polarity.

10. Apparatus of a type described comprising an inductor generator comprising a direct-current field winding circuit portion having a plurality of field coils, with field coils producing magnetic fields of opposite polarities connected in series and field coils producing magnetic fields of the same polarity connected in parallel, an alternating-current armature circuit-portion, a magnetic core means for magnetically coupling said circuit portions, means for varying the magnetic coupling of said circuit-portions so as to induce an alternating current in said armature circuit-portion, and capacitor means connected across said field winding circuit-portion, having considerably lower reactance than said field winding circuit-portion at the frequency of said alternating current, whereby to prevent excessive alternating-current voltages across said field winding circuit-portion.

11. An invention including that of claim 2, but further characterized by said field winding having input terminals, and by said circiut means comprising a capacitor connected across said input terminals, and a conductor-means connecting a plurality of said field coils in parallel.

12. An invention including that of claim 5 and further characterized by said field-winding circuit-portion having input terminals, and by the last said means comprising conductor means connecting a plurality of said field-coils in parallel, the last said field-coils being arranged to have the electromotive forces induced therein in a direction for establishing an alternating voltage across said input terminals.

13. Apparatus of a type described comprising an inductor generator comprising a stator having a magnetic portion comprising a plurality of relatively large relatively widely separated coil-slots, and a plurality of relatively small relatively closely spaced armature slots between each pair of said coil-slots, a direct-current field-winding circuit-portion comprising field coils, each field coil being arranged to have coil-sides in a pair of said coil-slots, for producing magnetic fields of opposite polarities consecutively around said stator, direct-current input terminals for said field winding, conductor-connections connecting field coils which produce magnetic fields of the same polarity directly in parallel, the connections and arrangements being such that the induced alternating-current electromotive forces in the parallelly-connected field coils tend to establish a voltage across said input terminals, an alternating current armature circuit-portion in said armature slots, a rotatory toothed magnetic core means for variably-magnetically coupling said circuit-portions, and alternating-current output terminals for said armature circuit-portion adapted to supply electric power.

14. An invention including that of claim 13 but characterized further by a low impedence means comprising a capacitor connected across said input terminals, having an impedance to said alternating current which is lower than that of said field-winding circuit-portion.

15. An invention including that of claim 13 but characterized further by said conductor connections comprising a conductor connecting in series those of said field coils which produce magnetic fields of opposite polarity.

16. An invention including that of claim 15 but characterized further by a direct-current exciter circuit and a low impedance-means comprising a capacitor across said input terminals, said low impedance-means having an impedance to said alternating current which is lower than that of said field-winding circuit-portion and said exciter circuit.

17. Apparatus of a type described comprising an inductor generator for supplying alternating current to a fluctuating reactive load, said inductor generator comprising a stator having a magnetic core-portion comprising a plurality of relatively small closely spaced armature slots and teeth around the inner periphery of the stator, an alternating-current armature circuit portion carried by said stator, alternating-current output terminals for said armature circuit portion adapted to supply said alternating current to said load, a rotor comprising a magnetic core-portion having a plurality of slots and teeth in its outer periphery adapted to coact with said armature slots and teeth during rotation of the rotor to produce an alternating current in said armature circuit portion, a direct-current field-winding carried by said stator and producing, when excited, unidirectional magnetic fields passing in and between said magnetic core-portions, and low impedance means comprising a capacitor connected across said direct-current field-winding, having an impedance to said alternating current which is lower than that of said direct-current field-winding.

18. Apparatus of a type described comprising an inductor gentrator for supplying alternating current to a fluctuating reactive load, said inductor generator comprising a stator having a magnetic core-portion comprising a plurality of relatively small closely spaced armature slots and teeth around the inner periphery of the stator, an alternating-current armature circuit portion carried by said stator, alternating-current output terminals for said armature circuit portion adapted to supply said alternating current to said load, a rotor comprising a magnetic core-portion having a plurality of slots and teeth in its outer periphery adapted to coact with said armature slots and teeth during rotation of the rotor to produce an alternating current in said armature circuit portion, a direct-current field-winding carried by said stator and producing, when excited, unidirectional magnetic fields passing in and between said magnetic core-portions, low impedance means comprising a capacitor connected across said direct-current field-winding, having an impedance to said alternating current which is lower than that of said direct-current field-winding, a direct-current exciter circuit having connections connected to said direct-current field-winding so that said capacitor is across said exciter circuit and between said field-winding and said exciter circuit, said exciter circuit having an impedance to said alternating current which is higher than that of said capacitor.

19. An invention in accordance with claim 17 but characterized further by load connections extending from said output terminals for energizing an inductive load, a phase-balancing capacitor connected across said load connections, and a circuit-interrupter in said load connections.

20. An invention in accordance with claim 18 but characterized further by load connections extending from said output terminals for energizing an inductive load, a phase-balancing capacitor connected across said load connections, and a circuit interrupter in said load connections.

FRANCIS J. JOHNS.

REFERENCES CITED

The following references are of record in the file of this patent:

UNITED STATES PATENTS

| Number | Name | Date |
| --- | --- | --- |
| 1,583,809 | Stoller | May 11, 1920 |
| 1,659,106 | Hildebrand | Feb. 14, 1928 |
| 2,024,906 | Bennett | Dec. 17, 1935 |
| 2,184,740 | Hansell | Dec. 26, 1939 |
| 2,355,560 | Roberds | Aug. 8, 1944 |